United States Patent
Alon et al.

(10) Patent No.: US 10,530,640 B2
(45) Date of Patent: Jan. 7, 2020

(54) DETERMINING TOPOLOGY USING LOG MESSAGES

(71) Applicant: HEWLETT PACKARD ENTERPRISE DEVELOPMENT LP, Houstyon, TX (US)

(72) Inventors: Gal Alon, Haifa (IL); Doron Shaked, Haifa (IL); Igor Giller, Yehud (IL); Marina Lyan, Yehud (IL); Ron Maurer, Haifa (IL); Noam Fraenkel, Yehud (IL); Igor Nor, Haifa (IL); Yair Horovitz, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 355 days.

(21) Appl. No.: 15/280,940

(22) Filed: Sep. 29, 2016

(65) Prior Publication Data

US 2018/0091359 A1    Mar. 29, 2018

(51) Int. Cl.
*H04L 12/24*     (2006.01)
*G06F 3/041*     (2006.01)

(52) U.S. Cl.
CPC ............ *H04L 41/069* (2013.01); *H04L 41/12* (2013.01); *G06F 3/04182* (2019.05)

(58) Field of Classification Search
None
See application file for complete search history.

(56) References Cited

U.S. PATENT DOCUMENTS

| | | | |
|---|---|---|---|
| 5,049,873 A | 9/1991 | Robins et al. | |
| 7,296,256 B2 | 11/2007 | Liu et al. | |
| 7,712,133 B2 * | 5/2010 | Raikar | G06F 21/554 |
| | | | 726/1 |
| 7,872,982 B2 | 1/2011 | Atkins et al. | |

(Continued)

FOREIGN PATENT DOCUMENTS

| | | |
|---|---|---|
| WO | PCT/US2015/023491 | 3/2015 |
| WO | WO-2016093839 A1 | 6/2016 |
| WO | WO-2016159968 | 10/2016 |

OTHER PUBLICATIONS

Fraenkel, Noam et al; Data Driven IT Topology Inference; https://www.labs.hpe.com/techreports/2016/HPE-2016-88.pdf; Oct. 25, 2016; 6 pages.

(Continued)

*Primary Examiner* — James A Edwards

(57) ABSTRACT

In some examples, a first pair of parameters in respective first and second log message streams associated with respective first and second source components and a second pair of parameters in the respective first and second log message streams may be identified. The first pair may be identical and the second pair may be identical. It may be determined that first pair of parameters was simultaneously generated and that the second pair of parameters was simultaneously generated in the first and in the second log message streams. A linkage score may be determined between the first and the second source components. The linkage score may be based on the determination that each of the respective first and the second pairs of parameters was simultaneously generated. It (Continued)

may be determined that that the first and second source components are topologically linked based on the linkage score.

20 Claims, 5 Drawing Sheets

(56) References Cited

U.S. PATENT DOCUMENTS

| | | | |
|---|---|---|---|
| 7,895,167 B2 | 2/2011 | Berg et al. | |
| 7,996,556 B2 | 8/2011 | Raghavan et al. | |
| 8,209,567 B2 | 6/2012 | Cohen et al. | |
| 8,306,325 B2* | 11/2012 | Chang | G06K 9/00456 358/1.9 |
| 8,381,193 B2 | 2/2013 | Cervantes et al. | |
| 8,949,177 B2 | 2/2015 | Chen et al. | |
| 8,949,394 B1* | 2/2015 | Papagiannaki | H04L 41/147 709/223 |
| 9,467,464 B2 | 10/2016 | Gula et al. | |
| 9,565,080 B2 | 2/2017 | Jain et al. | |
| 10,096,381 B1* | 10/2018 | McNair | G16H 10/60 |
| 2006/0184339 A1 | 8/2006 | Patterson et al. | |
| 2008/0201705 A1* | 8/2008 | Wookey | G06F 8/658 717/175 |
| 2011/0296244 A1* | 12/2011 | Fu | G06F 11/3608 714/37 |
| 2014/0006010 A1 | 1/2014 | Nor et al. | |
| 2014/0032552 A1* | 1/2014 | Cohen | H04L 41/065 707/737 |
| 2014/0208412 A1 | 7/2014 | Bray et al. | |
| 2014/0250333 A1* | 9/2014 | Duggan | G06F 11/079 714/37 |
| 2014/0304401 A1 | 10/2014 | Jagadish et al. | |
| 2014/0324409 A1 | 10/2014 | Simhon et al. | |
| 2015/0058567 A1* | 2/2015 | Hechtman | G06F 12/0811 711/122 |
| 2017/0012818 A1 | 1/2017 | Suragi Math | |

OTHER PUBLICATIONS

IBM Operations Analytics; Log Analysis;https://developer.ibm.com/itoa/docs/loganalysis/; Created on Feb. 25, 2016 / Modified on Apr. 4, 2016; 6 pages.

Kumar Shruthi, et al; Easy, Real-Time Big Data Analysis Using Storm; http://www.drdobbs.com/open-source/easy-real-time-big-data-analysis-using-s/240143874; Dec. 4, 2012; 4 pages.

Souza, et al; Error Log Analytics using Big Data and MapReduce; http://citeseerx.ist.psu.edu/viewdoc/download?doi=10.1.1.735.2314&rep=rep1&type=pdf; 2015; 4 pages.

Agarwala, S. et al., "Configuration Discovery and Monitoring Middleware for Enterprise Datacenters," 2010 IEEE Network Operations and Management Symposium—NOMS, 2010, 8 pages, available at http://researcher.ibm.com/researcher/files/us-sagarwala/Magellan-Agarwala-NOMS00.pdf.

Aharon, M. et al., "One Graph Is Worth a Thousand Logs: Uncovering Hidden Structures in Massive System Event Logs," Joint European Conference on Machine Learning and Knowledge Discovery in Databases, Springer Berlin Heidelberg, 2009, 17 pages.

Hewlett Packard Enterprise Development LP, "HPE Universal CMDB and UCMDB Configuration Manager," Data Sheet, Revision 6, Feb. 2016, 6 pages, available at http://www8.hp.com/h20195/V2/GetPDF.aspx/4AA1-6156ENW.pdf.

Kittler, J. et al., "Minimum Error Thresholding," Pattern Recognition 19.1, 1986, pp. 41-47, available at https://pdfs.semanticscholar.org/00f2/938d9f10e4bd37336f01b18a41d518f749ba.pdf.

Lindquist, D. et al., "IBM Service Management Architecture," IBM Systems Journal 46.3, 2007, pp. 423-440, available at https://pdfs.semanticscholar.org/c8cb/f94fa19dd5ae34dc3c6f7101a5d184d4657b.pdf.

Madduri, H. et al., "A Configuration Management Database Architecture in Support of IBM Service Management," IBM Systems Journal 46.3, 2007, pp. 441-457, available at http://citeseerx.ist.psu.edu/viewdoc/download?doi=10.1.1.113.3729&rep=rep1&type=pdf.

Naegle, R. et al, "IT Market Clock for IT Operations Management, 2014," Gartner, Inc., 2014, 55 pages.

R. J. Colville, "IT Service Dependency Mapping Vendor Landscape, 2012", Gartner report, 2012, ID: G00237891, 9 pages.

Servicenow, "IT Asset Management," White Paper, 2013, 12 pages.

Turner, D. et al., "California Fault Lines: Understanding the Causes and Impact of Network Failures," ACM SIGCOMM Computer Communication Review, vol. 40 No. 4 ACM, 2010, 12 pages, available at http://cseweb.ucsd.edu/~klevchen/tlss-sigcomm10.pdf.

* cited by examiner

DETERMINING TOPOLOGY USING LOG MESSAGES

BACKGROUND

In some examples, log messages may be collected from source components of computer systems. The source components may include, for example, hardware and/or software components, such as web services, enterprise applications, storage systems, servers, etc.

BRIEF DESCRIPTION

Some examples are described with respect to the following figures.

Figure 3:
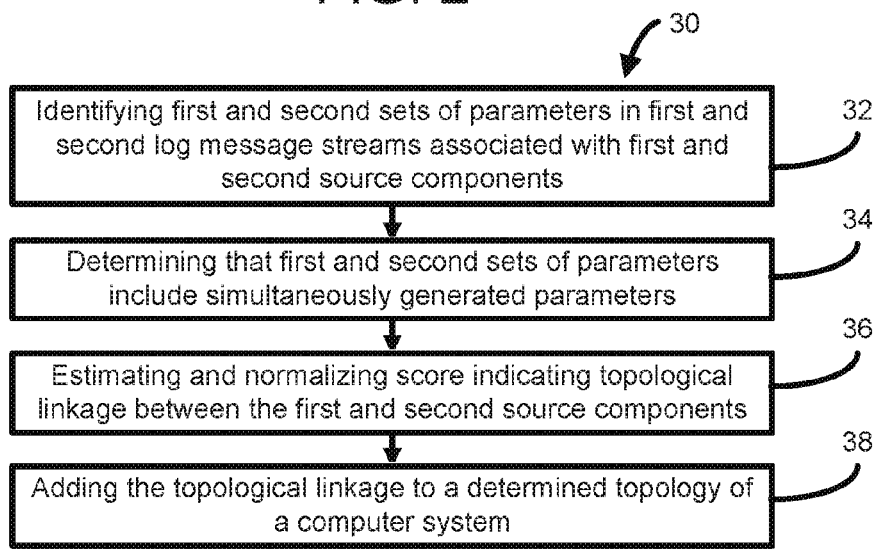
Figure 6:
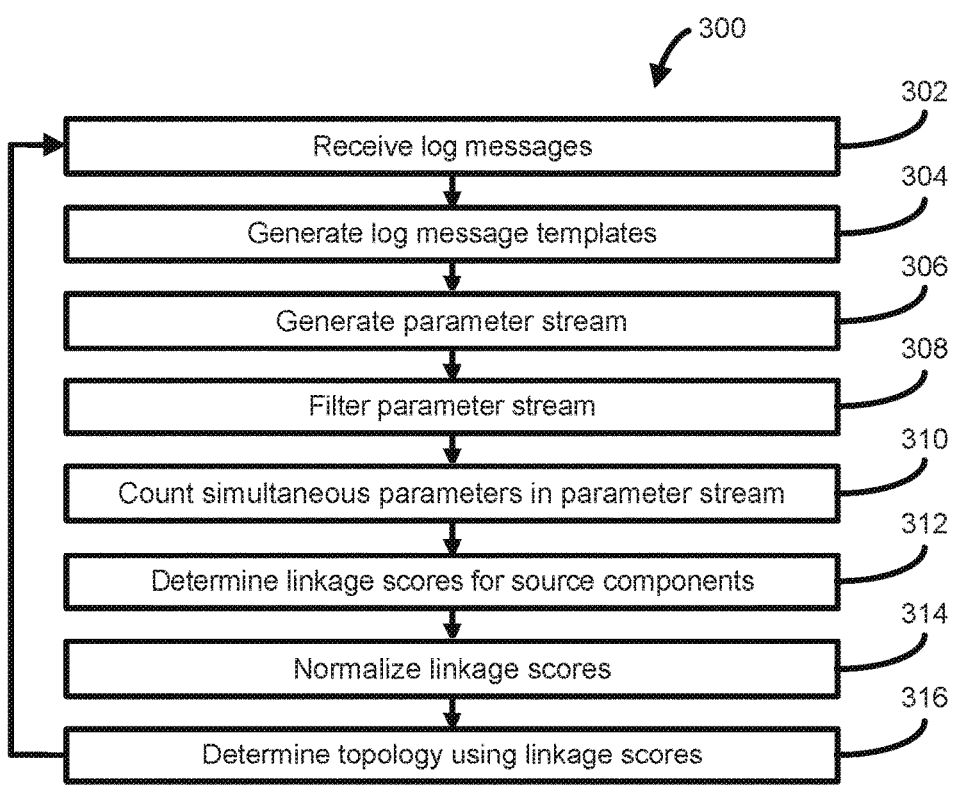
Figure 7:
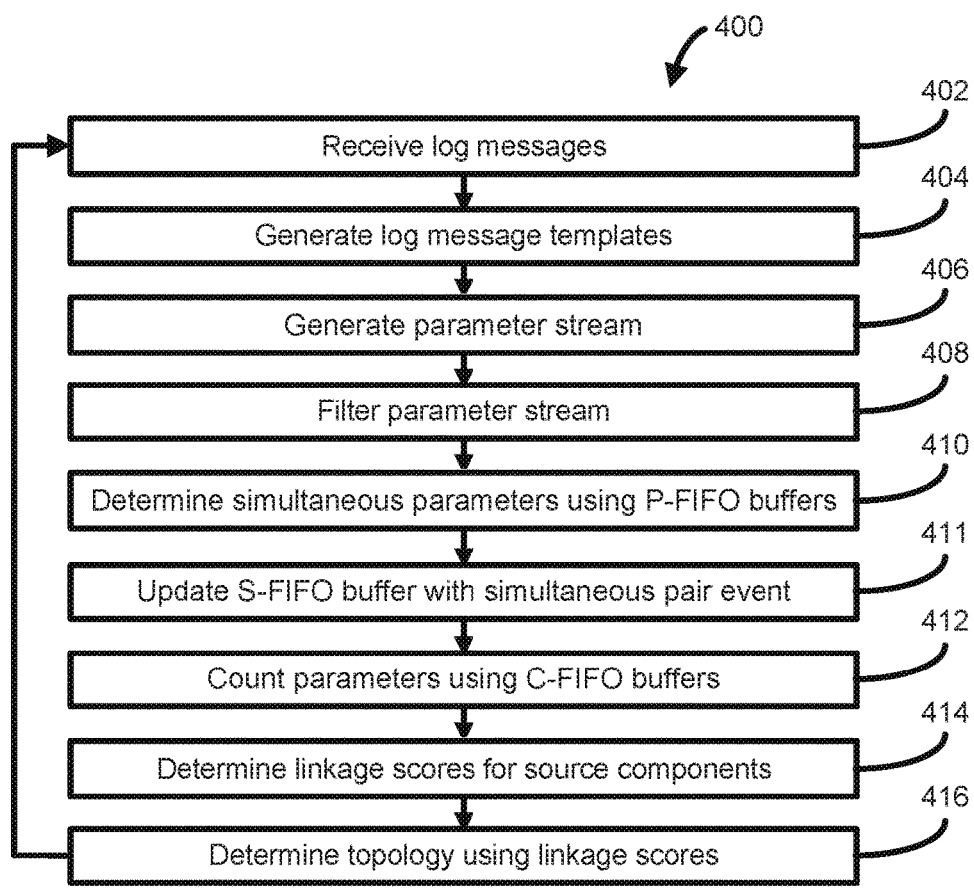

FIGS. 3, 6, and 7 are flow diagrams illustrating methods according to some examples.

DETAILED DESCRIPTION

The following terminology is understood to mean the following when recited by the specification or the claims. The singular forms "a," "an," and "the" mean "one or more." The terms "including" and "having" are intended to have the same inclusive meaning as the term "comprising."

A "topology" of a computer system may be the way that components of the computer system are related, i.e. "topologically linked". In some examples, issues or malfunctions in a first component may be the cause of issues or malfunctions in a second component that is topologically linked to the first component. In other examples, issues or malfunctions in topologically linked components are common effects of the same issues or malfunctions. Therefore, generating a topology model representing the topology of a computer system may be helpful for IT management of that computer system. However, tracking changes in the topology of a computer system in the topology model may be difficult due to frequent and major changes in the topology.

As discussed earlier, log messages may be collected from the source components of computer systems. A "log message" is a textual message. In some examples, log messages may include human-readable text. In some examples, log messages may indicate events, such as errors, occurring in a computing system. Log messages may, for example, be stored in log files. Log messages may be generated by, stored on, and collected from source components of a computer system such as a computer network, and may be used in system development for debugging and understanding the behavior of a system. These log messages may store a large amount of information describing the behavior of systems. For example, systems may generate thousands or millions of log messages per second.

Accordingly, the present disclosure provides examples in which log messages may be used to generate topology models of computer systems. Because log messages may, for example, already be collected for various purposes other than for generating topology models, little additional computational overhead may be expended in using the log messages to generate topology models. In some examples, a topology model may be generated based on a simultaneous appearances of instances of a parameter in log messages from multiple source components. For example, if the same parameter appears in simultaneous log messages from different source components, then it may be inferred that these source components may be topologically linked, particularly if the parameter rarely appears in log messages from source components in the computer system.

As used herein, "simultaneous" means that two events both occur within a time period (e.g. predetermined time period) relative to each other (e.g. within less than 10 seconds of each other). The time of each log message or event may be determined by a timestamp. A timestamp may be part of the log message or event in a pre-determined position (e.g. the start of the message) that includes the time (e.g. second, minute, hour, day, month, year, or a combination thereof, etc.) when the log message or event occurred or was created. In some examples, the timestamp may be corrected for time zone or daylight saving time so as to be able to compare timestamps across different time zones.

Figure 1:
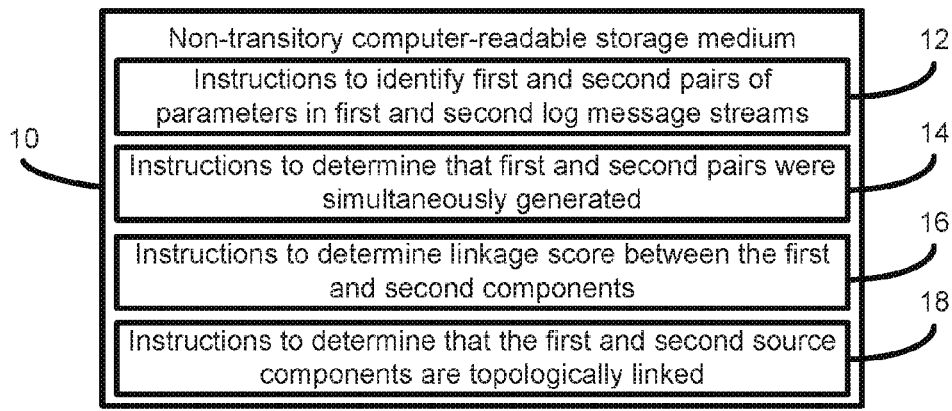
FIG. 1 is a block diagram illustrating a non-transitory computer readable storage medium according to some examples.

FIG. 1 is a block diagram illustrating a non-transitory computer readable storage medium 10 according to some examples. The non-transitory computer readable storage medium 10 may include instructions 12 executable by a processor to identify a first pair of parameters in respective first and second log message streams associated with respective first and second source components and a second pair of parameters in the respective first and second log message streams. The first pair may be identical and the second pair may be identical. The non-transitory computer readable storage medium 10 may include instructions 14 executable by a processor to determine that first pair of parameters was simultaneously generated and that the second pair of parameters was simultaneously generated in the first and in the second log message streams. The non-transitory computer readable storage medium 10 may include instructions 16 executable by a processor to determine a linkage score between the first and the second source components. The linkage score may be based on the determination that each of the respective first and the second pairs of parameters was simultaneously generated. The non-transitory computer readable storage medium 10 may include instructions 18 executable by a processor to determine that the first and second source components are topologically linked based on the linkage score.

Figure 2:
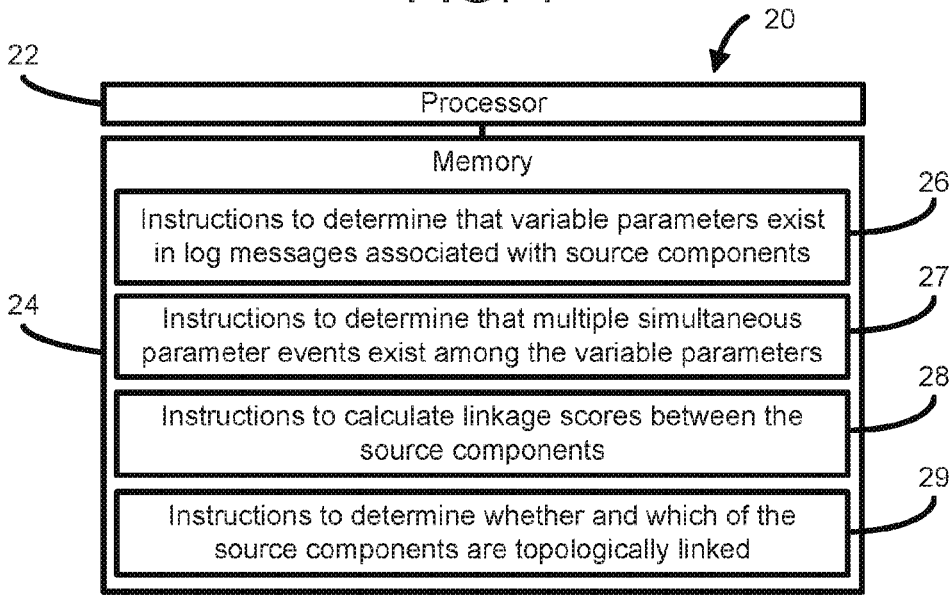
FIGS. 2 and 4 are block diagrams illustrating systems according to some examples.

FIG. 2 is a block diagram illustrating a system 20 according to some examples. The system 20 may include a processor 22 and a memory 24. The memory 24 may include instructions 26 executable by the processor to determine that variable parameters exist in log messages associated with respective source components. The memory 24 may include instructions 27 executable by the processor to determine that multiple simultaneous parameter events exist among the variable parameters in the log messages, each of the multiple simultaneous parameter events representing identical variable parameters that are associated with timestamps that differ by less than a threshold time period. The memory 24 may include instructions 28 executable by the processor to calculate linkage scores between the source components based on the determination that the multiple simultaneous parameter events exist. The memory 24 may include instructions 29 executable by the processor to determine whether and which of the source components are topologically linked based on the calculation.

FIG. 3 is a flow diagram illustrating a method 30 according to some examples. The following may be performed by a processor. The method 30 may include: at 32, identifying a first set of parameters in a first log message stream associated with a first source component and a second set of parameters in a second log message stream associated with a second source component; at 34, determine that a first parameter of the first set of parameters and a second parameter of the second set of parameters identical in value to the first parameter were simultaneously generated and that a third parameter of the first set of parameters and fourth parameter of the second set of parameters identical in value to the third parameter were simultaneously generated within a predetermined threshold time period in the first and in the second log message stream; at 36, estimating and normalizing a score indicating a topological linkage between the first and the second source components based on the determination; and at 38, adding the topological linkage to a determined topology of a computer system.

Figure 4:
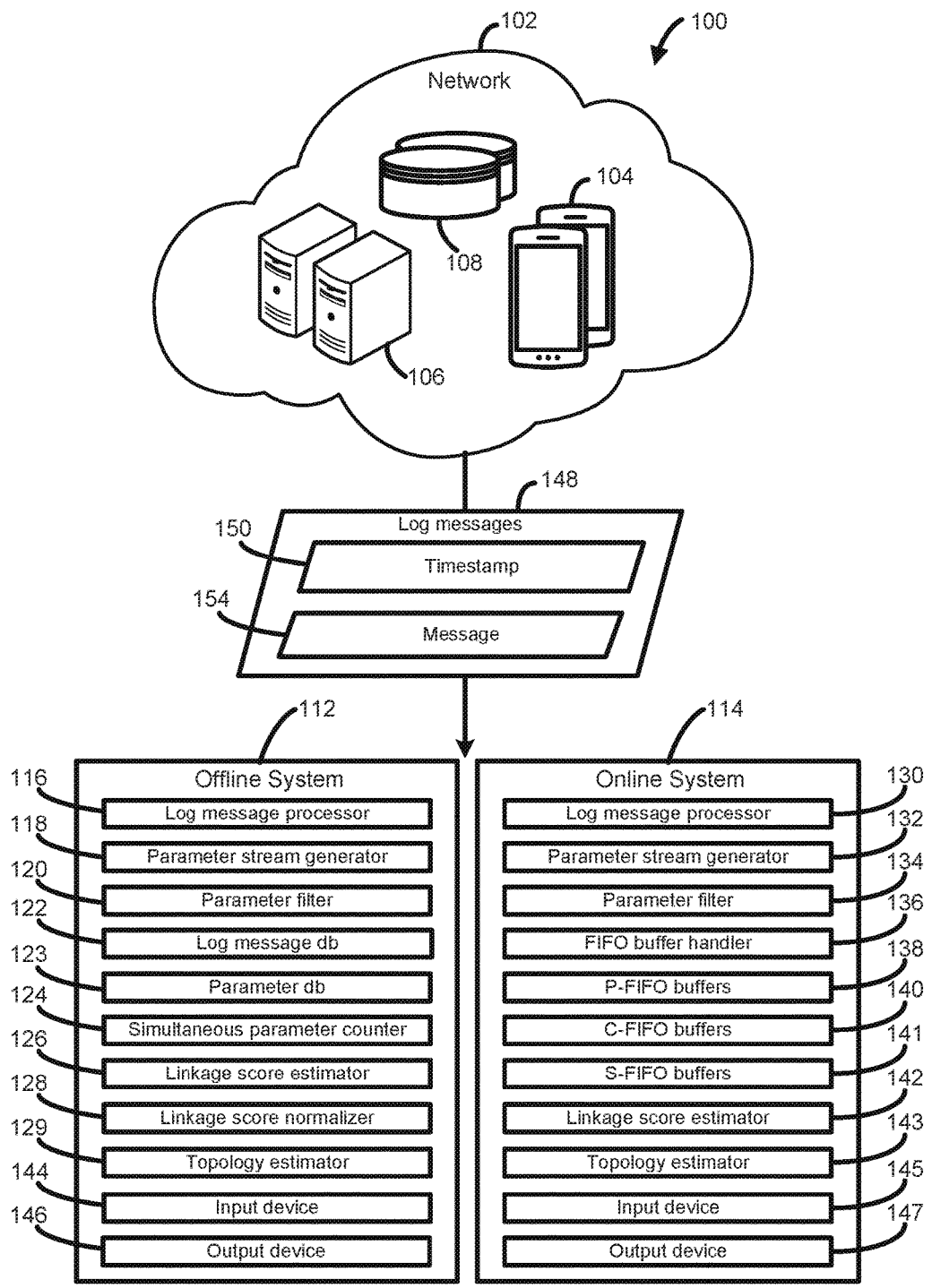

FIG. 4 is a block diagram illustrating a system 100 according to some examples. The system 100 includes a computer system such as a network 102. The network 102 may include an application layer that includes applications 104 (e.g. mobile applications, web applications, on-premises applications, cloud based applications, etc., which may be used by end users), e.g. running on user computing devices or other computing devices such as servers. The network 102 may include a computing layer including computing devices 106 such as servers, and a database layer including databases 108. Each of the databases 108 may be accessible to each of the applications 104, for example through the computing devices 106. Other devices may also be present in the network 102, such as printing devices, etc. The network 102 may, for example, be a local area network (LAN), wide area network (WAN), the Internet, or any other network. In some examples, the network 102 may comprise components of an information technology (IT) infrastructure of an organization, such as a data center. Each of the applications 104, computing devices 106, and databases 108 may comprise a component or multiple components.

The system 100 may include topology generation systems, including an offline system 112 and an online system 114. In some examples, the system 100 may include one of the offline system 112 and online system 114, and not the other.

The offline system 112 may be suited to operate on a set of collected messages. It may be operated periodically each time an additional threshold number of log messages have been collected. The offline system 112 may include a log message processor 116, parameter filter 120, parameter stream generator 118, log message database 122, parameter database 123, simultaneous parameter counter 124, linkage score estimator 126, linkage score normalizer 128, and topology estimator 129.

The online system 114 may be suited to operate dynamically while log messages are being collected. The online system 114 may include a log message processor 130, parameter stream generator 132, parameter filter 134, FIFO (first-in-first-out) buffer handler 136, simultaneous parameter FIFO buffers 138 (i.e. P-FIFO$^\pi$ buffers), parameter count FIFO buffers 140 (i.e. C-FIFO$^\pi$ buffers), simultaneous event FIFO buffer 141 (i.e. S-FIFO buffer), linkage score estimator 142, and topology estimator 143.

Each of the offline system 112 and the online system 114 may support direct user interaction. For example, the offline system 112 and the online system 114 may respectively include user input devices 144 and 145, such as a keyboard, touchpad, buttons, keypad, dials, mouse, track-ball, card reader, or other input devices. Additionally, the offline system 112 and the online system 114 may respectively include output devices 146 and 147 such as a liquid crystal display (LCD), video monitor, touch screen display, a light-emitting diode (LED), or other output devices. The output devices may be responsive to instructions to display a visualization including textual and/or graphical data including representations of log messages, parameters, FIFO buffers, linkage scores, eventual estimated topology and any other data generated during any part of the processes described herein.

In some examples, components of the offline system 112 (log message processor 116, parameter filter 120, parameter stream generator 118, simultaneous parameter counter 124, linkage score estimator 126, linkage score normalizer 128, and topology estimator 129) and the online system 114 (log message processor 130, parameter stream generator 132, parameter filter 134, FIFO (first-in-first-out) buffer handler 136, P-FIFO$^\pi$ buffers 138, C-FIFO$^\pi$ buffers 140, S-FIFO buffer 141, linkage score estimator 142, and topology estimator 143) may each be implemented as a computing system including a processor, a memory such as non-transitory computer readable medium coupled to the processor, and instructions such as software and/or firmware stored in the non-transitory computer-readable storage medium. The instructions may be executable by the processor to perform processes defined herein. In some examples, the components of the offline system 112 and the online system 114 mentioned above may include hardware features to perform processes described herein, such as a logical circuit, application specific integrated circuit, etc. In some examples, multiple components may be implemented using the same computing system features or hardware.

Each of the log message database 122, parameter database 123, P-FIFO$^\pi$ buffers 138, C-FIFO$^\pi$ buffers 140, and S-FIFO buffer 141 may be implemented as a memory such as non-transitory computer readable medium storing data.

In some examples, the offline system 112 may receive a log message stream including log messages 148 from source components in a computer system such as the network 102. Table 1 illustrates eight example log messages 148 collected from the network 102, although any number of log messages 148 may be collected. For example, thousands or millions of log messages 148 may be collected.

In this example, the log messages 148 may each include a timestamp 150 representing a time when the log message 148 was generated, and a message 154 including a description of an event associated with the source component such as an error. The message 154 may include text that is not variable relative to other similar messages representing similar events. However, at least part of message 154 may additionally include variable parameters such as, for example, varying textual (e.g. numerical) metrics. Additionally, the timestamp 150 may include variable time parameters. In some examples, each log message 148 may be associated with a source component ID which may be collected along with the log message 148. A source component ID may represent a source component from which the log message 148 was generated. The timestamps 150 may include times that are synchronized across different sources.

As shown, the collected log messages 148 may be in a raw format, in which the portions (e.g. timestamps 150 and messages 154, and parameters therein) of the log messages 148 may not be parsed or tokenized.

TABLE 1

Log message stream including collected log messages 148

| Source component ID | Log message 148 |
|---|---|
| BDG1 | Jul. 16, 2013 04:55:53 [15] INFO-Starting monitor operation against data 'EDW Bridgeway Production Database (EMR)'. |
| BDG1 | Jul. 16, 2013 04:55:55 [167] INFO-Monitor operation against data 'EDW Bridgeway Production Database (EMR)' completed. |
| BDG1 | Jul. 16, 2013 04:55:55 [167] INFO-Query Statement ID: 35083376 was costed successfully at: Jul. 16, 2013 04:55:55. Attempt 0. |
| BDG1 | Jul. 16, 2013 04:56:04 [87] INFO-Item with key 0760afe0-078f-40f8-a9aa-68023ddfc81a added to cache. |
| BDG1 | Jul. 16, 2013 04:56:12 [498] INFO-Monitor operation against data 'EDW NeoView Production Database (TITANIUM)' completed. |
| BDG1 | Jul. 16, 2013 04:56:12 [392] INFO-Monitor operation against data 'EDW NeoView Production Database (MERCURY)' completed. |
| BDG1 | Jul. 16, 2013 04:58:55 [438] INFO-Starting monitor operation against data 'EDW NeoView Production Database (PLATINUM)'. |
| BDG1 | Jul. 16, 2013 04:59:43 [352] INFO-Query Statement ID: 35083435 was costed successfully at: Jul. 16, 2013 04:59:43. Attempt 0. |

In some examples, the log message database 122 may store the log messages 148 (e.g. as in Table 1). When additional log messages 148 are received by the offline system 112, they may be stored in the log message database 122.

In some examples, the log message processor 116 may generate a log message template for each of the log messages 148 and classify the log messages 148 with associated log message templates. Additionally, the log message processor 116 may, for each of the log messages 148 (such as those in Table 1), determine that each of the substrings of the log message 148 is represented by tokens. A substring that is "tokenized" is associated with a semantic token, which is a character that categorizes the substring as a type of variable parameter. Therefore, each of the substrings may be associated with a semantic token that categorizes the substring. For example, the substrings of the log messages 148 may be represented by the set of log message templates shown in Table 2, which shows the date token <D>, the time token <T>, the number token <#>, and the parameter token <P>. Each of these semantic tokens may represent variable parameters, which are variable strings taking different values in different log messages 148 represented by the same log message template. That is, a parameter may be designated as a variable parameter based on a threshold amount of variation of the parameter across at least some of the log messages 148 (e.g. log messages 148 represented by a particular log message template). Fixed parameters may be represented by the fixed, identical substring in the log message template. The log message processor 116 may be implemented using techniques described in U.S. Pat. No. 8,209,567 filed on Jan. 28, 2010 and titled "Message Clustering Of System Event Logs" or in International Publication No. WO2016/093839 filed on Dec. 11, 2014 and titled "STRUCTURING OF SEMI-STRUCTURED LOG MESSAGES". Each of these references are hereby incorporated herein in their entireties.

In the example of the eight log messages 148 in Table 1, the log message processor 116 may generate the four log message templates shown in Table 2, each having a template ID. In particular, the first log message template of Table 2 corresponds to the second, fifth, and sixth log messages 148 in Table 1, the second log message template of Table 2 corresponds to the first and seventh log messages 148 in Table 1, the third log message template of Table 2 corresponds to the third and eighth log messages 148 in Table 1, and the fourth log message template of Table 2 corresponds to the fourth log message 148 in Table 1.

TABLE 2

Log message templates

| Template ID | Log Message Template |
|---|---|
| 1 | <D> <T> [<#>] INFO-Monitor operation against data 'EDW <P> Production Database (<P>)' completed. |
| 2 | <D> <T> [<#>] INFO-Starting monitor operation against data 'EDW <P> Production Database (<P>)'. |
| 3 | <D> <T> [<#>] INFO-Query Statement ID: <#> was costed successfully at <D> <T>. Attempt <#>. |
| 4 | <D> <T> [<#>] INFO-Item with key <P> added to cache. |

In some examples, the parameter stream generator 118 may generate a parameter stream, which may include, for each log message 148, a row including the source component ID for the log message 148, the timestamp 150 of the log message 148, the template ID of the log message template corresponding to the log message 148, and the variable parameters in the message 154 of the log message 148. The parameter stream generator 118 may order the parameter stream according the time of the timestamp (e.g. from earliest to latest).

Table 3 shows an example parameter stream corresponding to the log messages 148 of Table 1 and the log message templates of Table 2.

TABLE 3

Parameter stream

| Source component ID | Timestamp 150 | Template ID | Variable parameters of message 154 |
|---|---|---|---|
| BDG1 | Jul. 16, 2013 04:55:53 | 2 | 15, Bridgeway, EMR |
| BDG1 | Jul. 16, 2013 04:55:55 | 1 | 167, Bridgeway, EMR |
| BDG1 | Jul. 16, 2013 04:55:55 | 3 | 167, 35083376, Jul. 16, 2013, 04:55:55, 0 |
| BDG1 | Jul. 16, 2013 04:56:04 | 4 | 87, 0760afe0-078f-40f8-a9aa-68023ddfc81a |
| BDG1 | Jul. 16, 2013 04:56:12 | 1 | 498, NedView, TITANIUM |
| BDG1 | Jul. 16, 2013 04:56:12 | 1 | 392, NedView, MERCURY |
| BDG1 | Jul. 16, 2013 04:58:55 | 2 | 438, NedView, PLATINUM |
| BDG1 | Jul. 16, 2013 04:59:43 | 3 | 352, 35083435, Jul. 16, 2013, 04:59:43, 0 |

In some examples, the parameter stream generator 118 may then also separate variable parameters in messages 154 of log messages 148 such that they are provided with their own rows in the parameter stream. Thus, in each row, a respective variable parameter in a message 154 is associated with the source component ID for the log message 148 containing the variable parameter, the timestamp 150 of the log message 148 containing the variable parameter, and the template ID of the log message template corresponding to the log message 148 containing the variable parameter. If a log message 148 has multiple variable parameters in its message 154, then there may be multiple corresponding rows; one for each of the variable parameters in the message 154. The parameter stream generator 118 may continue to order the parameter stream according the time of the timestamp (e.g. from earliest to latest).

Table 4 shows an example parameter stream in which variable parameters have been separated into their own rows in the parameter stream. The example of Table 4 includes parameters from log messages 148 collected from multiple source components: BDG1, BGD2, and BGD3,

TABLE 4

Parameter stream

| Source component ID | Time Stamp | Template ID | Filtered parameters from messages 154 |
|---|---|---|---|
| BDG1 | Jul. 16, 2013 04:55:55 | 3 | 167 |
| BDG1 | Jul. 16, 2013 04:55:55 | 3 | 35083376 |
| BDG1 | Jul. 16, 2013 04:55:55 | 3 | Jul. 16, 2013 |
| BDG1 | Jul. 16, 2013 04:55:55 | 3 | 04:55:55 |
| BDG1 | Jul. 16, 2013 04:55:55 | 3 | 0 |
| BDG2 | Jul. 16, 2013 04:56:01 | 7 | 87 |
| BDG2 | Jul. 16, 2013 04:56:01 | 7 | 0760afe0-078f-40f8-a9aa-68023ddfc81a |
| BDG1 | Jul. 16, 2013 04:56:04 | 4 | 87 |
| BDG1 | Jul. 16, 2013 04:56:04 | 4 | 0760afe0-078f-40f8-a9aa-68023ddfc81a |
| BDG3 | Jul. 16, 2013 04:56:08 | 1 | 376 |
| BDG3 | Jul. 16, 2013 04:56:08 | 1 | NeoView |
| BDG3 | Jul. 16, 2013 04:56:08 | 1 | TITANIUM |
| BDG1 | Jul. 16, 2013 04:56:12 | 1 | 498 |
| BDG1 | Jul. 16, 2013 04:56:12 | 1 | NeoView |
| BDG1 | Jul. 16, 2013 04:56:12 | 1 | TITANIUM |

In some examples, the parameter filter 120 may filter a variable parameter or multiple variable parameters from the parameter stream. As will be discussed, parameters may be later used to determine topological linkages between source components. However, different source components may include identical variable parameters even when there is no topological linkage between these source components.

For example, different, unlinked source components may generate log messages 148 at the same time, and therefore may include simultaneous and identical timestamps (e.g. '01:47 am'). Therefore, the parameter filter 120 may filter the parameter stream to remove variable parameters comprising timestamps.

In addition, the parameter filter 120 may filter the parameter stream to remove variable parameters that include fewer than a predetermined threshold number of characters (e.g. digits) in length (e.g. less than three digits, or less than four characters). This may be performed because of a relatively higher probability, for shorter variable parameters relative to longer variable parameters, of identical variable parameters generated simultaneously by unlinked source components due to randomness or coincidence.

Table 5 shows an example parameter stream in which variable parameters have been separated into their own rows in the parameter stream, and are filtered by the parameter filter 120. In particular, the parameter stream of Table 5 is a filtered version of the unfiltered parameter stream of Table 4, where variable parameters that are timestamps and variable parameters with fewer than four characters have been removed,

TABLE 5

Filtered parameter stream

| Source component ID | Time Stamp | Template ID | Filtered parameters from messages 154 |
|---|---|---|---|
| BDG1 | Jul. 16, 2013 04:55:55 | 3 | 35083376 |
| BDG2 | Jul. 16, 2013 04:56:01 | 7 | 0760afe0-078f-40f8-a9aa-68023ddfc81a |
| BDG1 | Jul. 16, 2013 04:56:04 | 4 | 0760afe0-078f-40f8-a9aa-68023ddfc81a |
| BDG3 | Jul. 16, 2013 04:56:08 | 1 | NeoView |
| BDG3 | Jul. 16, 2013 04:56:08 | 1 | TITANIUM |
| BDG1 | Jul. 16, 2013 04:56:12 | 1 | NeoView |
| BDG1 | Jul. 16, 2013 04:56:12 | 1 | TITANIUM |

In some examples, the parameter database 123 may store the filtered parameter stream (e.g. as in Table 5). When additional log messages 148 are received by the offline system 112 and stored in the log message database 124, the filtered parameter stream stored in the parameter database 123 may be updated with variable parameters using the log message processor 116, the parameter stream generator 118, and the parameter filter 120. In some examples, the parameter database 123 may store other types of data, such as the unfiltered parameter stream (e.g. as in Table 3 or 4), and the log message templates (e.g. as in Table 2).

In some examples, the simultaneous parameter counter 124 may, for each unique parameter in each pair of source components, identify (e.g. determine) the number of simultaneous parameters in the filtered parameter stream (stored in the log message database 122 or generated based on other data stored in the log message database 122, for example the unfiltered parameter stream, log message templates, and/or log messages 148).

As discussed earlier, a simultaneous parameter (SP) is a parameter (e.g. a variable parameter as shown in the example parameter stream of Table 5) that appears in two log messages from two source components within a particular time period (e.g. predetermined time period) such that they are within less than a threshold (e.g. predetermined) time period $\Delta t$ relative to each other (e.g. as reflected in the timestamps of the two log messages). For example, simultaneous parameters may be drawn from log messages that contain timestamps representing times (e.g. including second, minute, hour, day, month, year, or a combination thereof, etc.) that are less than a threshold time period $\Delta t$ different from each other. Topologically linked source components may be predicted to generate more simultaneous parameters than expected by chance. Accordingly, the number of simultaneous parameters of parameter $\pi$ between sources components i and j may be designated by $SP_{i,j}^{\pi}$. It is understood herein that $SP_{i,j}^{\pi}$ and $SP_{j,i}^{\pi}$ refer to the same simultaneous parameter variable, such that $SP_{i,j}^{\pi}$ is always equal to $SP_{j,i}^{\pi}$ (and so if one is given a particular value the other is given the same value, or if one is incremented then the other is incremented).

In some examples, the linkage score estimator 126 may, for each pair of source components, determine a score representing a topological linkage between the pair of source components. In some examples, for a given pair of source components i and j, the score may be given by:

$$Score_{i,j} = \Sigma_\pi W_{i,j}^{\pi}(SP_{i,j}^{\pi}) \qquad (1)$$

This score is a weighted sum of each $SP_{i,j}^{\pi}$, where the sum is over unique parameters $\pi$ (e.g. variable parameters such as those from Table 5). Put another way, for a given pair of source components i and j, there may be a different $SP_{i,j}^{\pi}$ for each unique parameter, and these simultaneous parameters may be summed in the weighted sum.

A higher $SP_{i,j}^{\pi}$ may be more likely when the source components i and j are topologically related. However, when a parameter $\pi$ appears very often in log messages 148 of many source components, a high $SP_{i,j}^{\pi}$ may not necessarily indicate a topological linkage. For example, parameters such as 'start' or 'stop' may occur often in many log messages 148, and as a result may be more likely to occur simultaneously in unlinked source components. In the example parameter stream of Table 5, the parameters 'NeoView' and 'Titanium' occur often, and therefore may be more likely to occur simultaneously in unlinked source components. Conversely, if a parameter π appears very few times in a large number of log messages 148 generated by a large number of source components, then $SP_{i,j}^{\pi}=1$ may be a strong indication of a topological linkage between source components i and j. In the example parameter stream of Table 5, the parameter '0760afe0-078f-40f8-a9aa-68023ddfc81a' occurs rarely, and therefore may be less likely to occur simultaneously in unlinked source components. Although the parameter stream of Table 5 includes a small number of parameters, in reality there may be a much larger number of available statistics on the parameter stream, and therefore the above discussion of the frequency of various parameters may be based on a much larger set of parameters.

Accordingly, the weights in equation 1 may be selected in a way to give lower weights to simultaneous parameters for which the parameter appears often in the parameter stream, and higher weights to simultaneous parameters for which the parameters appears rarely in the parameter stream. For example, the weights may be proportional to the rareness of the parameter in the parameter stream.

Figure 5:
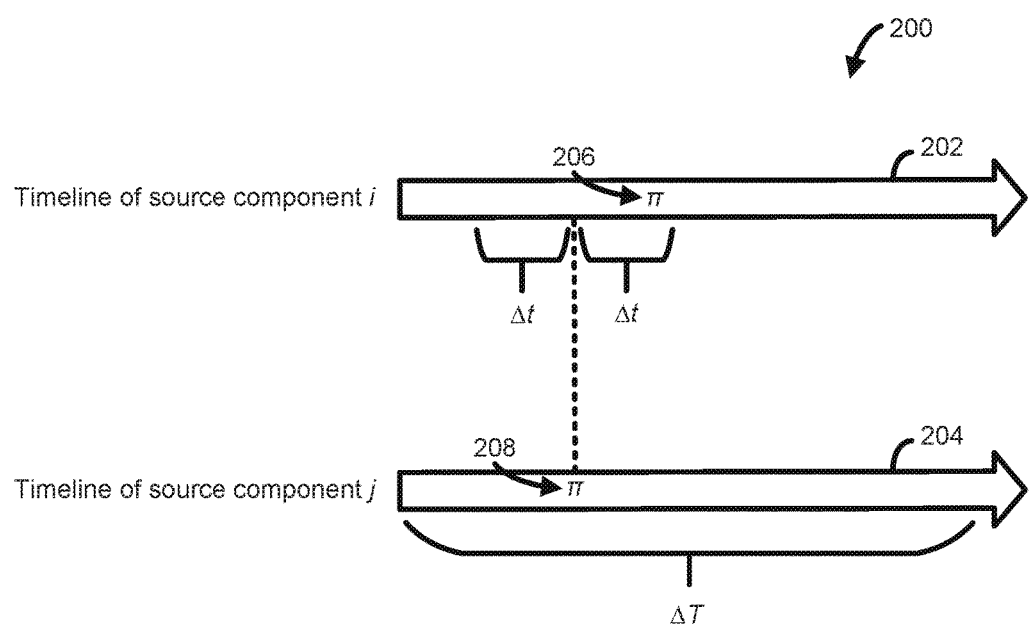
FIG. 5 is a schematic diagram illustration timelines of source components specifying generation of parameters according to some examples.

FIG. 5 is a schematic diagram illustration timelines 200 of source components i and j specifying generation of parameters according to some examples. The timelines 200 include timeline 202 which corresponds to source component i and timeline 204 which corresponds to source component j. The time period $\Delta T$ is the time period for which the statistics are used when calculating each $Score_{i,j}$, namely the time period for which the log messages 148 are collected.

As discussed earlier, a simultaneous parameter (SP) is a parameter that appears in log messages 148 from two source components i and j within a threshold time period $\Delta t$ relative to each other. Therefore, $v=\Delta T/\Delta t$ may represent the number of such threshold periods of time $\Delta t$ within the time period $\Delta T$ for which statistics are used.

Then, $p=2/v$ represents the probability that, when a parameter $\pi$ appears once in time period $\Delta T$ of the timeline 202 for source component i (e.g. as designated by 206 in FIG. 5) and once in the same time period $\Delta T$ of the timeline 204 for an unrelated source component j (e.g. as designated by 208 in FIG. 5), the parameter $\pi$ is a simultaneous parameter. If $n_i^{\pi}$ represents the number of occurrences of parameter $\pi$ in time period $\Delta T$ of the timeline 202 for source component i, and $n_j^{\pi}$ represents the number of occurrences of parameter $\pi$ in time period $\Delta T$ of the timeline 204 for source component j, then the expected simultaneous parameter count of independent uniformly distributed instances of parameter $\pi$ (i.e. the simultaneous parameter count resulting from random noise in unrelated components) may be given by:

$$\hat{n}_{i,j}^{\pi} = p \cdot n_i^{\pi} \cdot n_j^{\pi} \qquad (2)$$

Accordingly, each linkage score may be determined by using the simultaneous parameter count above the number that would be expected based on the random noise as reflected by equation 2, and by weighting the simultaneous parameter counts inversely proportionally to the expected number of simultaneous parameter counts due to random noise. In this way, the linkage score is calibrated such that the linkage score having above a threshold value (e.g. above zero) indicates that a number of simultaneous parameters of the parameters in the parameter stream are not due to random noise.

Therefore, turning back to FIG. 4, for a given pair of source components i and j, the resulting score determined by the linkage score estimator 126 may be given by:

$$Score_{i,j} = \sum_\pi \frac{v}{2n_i n_j}(SP_{i,j}^{\pi} - \hat{n}_{i,j}^{\pi})^+ = \sum_\pi \left(\frac{v}{2n_i n_j} \cdot SP_{i,j}^{\pi} - 1\right)^+ \qquad (3)$$

While equation 3 may appear linear in simultaneous parameter counts, it is not, due to the soft threshold function where $X^+ = X$ for $X>0$ and otherwise $X^+=0$.

In some examples, the linkage score normalizer 128 may normalize the different determined $Score_{i,j}$ values (representing different sets of source components i and j) relative to each other such that the $Score_{i,j}$ values can be used together to infer a global topology of the source components of the network 102 as a whole or a local topology of a number (e.g. more than two) of the source components in the network 102.

In some examples, each $Score_{i,j}$ may be normalized by dividing by the sum of $Score_{i,j}$ values involving the same source component i as the $Score_{i,j}$ being normalized, and dividing by the sum of $Score_{i,j}$ values involving the same source component j as the $Score_{i,j}$ being normalized. The resulting normalized score may be given by:

$$NormScore_{i,j} = \frac{Score_{i,j}}{(\sum_i Score_{i,j})(\sum_j Score_{i,j})} \quad (4)$$

In other examples, each $Score_{i,j}$ may be normalized by dividing by the root mean square (RMS) of $Score_{i,j}$ values involving the same source component i as the $Score_{i,j}$ being normalized, and dividing by the root mean square (RMS) of $Score_{i,j}$ values involving the same source component j as the $Score_{i,j}$ being normalized. The resulting normalized score may be given by:

$$NormScore_{i,j} = \frac{Score_{i,j}}{\sqrt{\sum_i Score_{i,j}^2} \sqrt{\sum_j Score_{i,j}^2}} \quad (5)$$

The techniques represented by equations 4 and 5 may be suitable for determining a local or global topology involving each of the source components of the network 102.

In some examples, each of the foregoing normalization techniques may reduce errors in linkage determination resulting from scores involving certain source components having much higher scores due to those source components being significantly more active than other source components, causing higher scores that are not necessarily more reflective of topological linkages than some scores with lower values.

In some examples, the foregoing normalization techniques may amplify some low scores involving some source components that have exhibit little activity. To the extent these scores are positive, their simultaneous parameter counts may not indicate topological linkages involving such a source component, and instead include noise. However, because noisy scores may be small, and these low activity components may be flagged according to a low score activity level. For example, an score activity level for a source component i may be given by summing each of the scores involving the source component i:

$$Activity_i = \Sigma_j Score_{i,j} \quad (6)$$

Then, any score activity levels for any source components below a threshold (e.g. predetermined threshold) score activity level may be removed, and not used in the normalization determination techniques described earlier (e.g. using equations 4 and 5). Instead, the scores involving source components having high score activity levels may be used in the normalization determination techniques. In some examples, as described by J. Kittler and J. Illingworth in "Minimum Error Thresholding, Pattern Recognition Letters, Vol. 19(1), 41-47, 1986, which is hereby incorporated by reference herein in its entirety, low score activity levels may be identified by modeling the determined score activity levels as a collection as two Gaussian distributions, and performing thresholding to separate these distributions. Source components with score activity levels lower than the threshold may likely be those source components having scores representing noise rather than topological linkages, and therefore may not be used in the normalization determination techniques.

In some examples, the topology estimator 129 may, for each pair of source components i and j, predict whether there is a topological linkage between the source components i and j. The prediction may be based on whether the normalized score (e.g. $NormScore_{i,j}$) for that pair of source components i and j is above a threshold score (e.g. predetermined threshold score). Therefore, the topology estimator 129 may determine a topology including each of the components of the network 102 (or of a subset of the network 102). In some examples, un-normalized score may instead be used to determine the topology.

Turning to the online system 114, the online system 114 may receive log messages 148 from source components in a computer system such as the network 102. The online system 114, like the offline system 112, may receive the example log messages 148 shown in FIG. 1. The online system 114 may continually receive log messages 148 while performing the remainder of its processing, such that its topology predictions may be continually updated based on recently received log messages.

In some examples, the log message processor 130 may partition each of the log messages 148 into substrings according to a partitioning rule, cluster the log messages 148 into clusters, and generate a log message template for each of the log messages 148 (e.g. as in Table 2). This may be done in a similar way as described earlier relative to log message processor 116.

In some examples, the parameter stream generator 132 may generate a parameter stream (e.g. as in Table 3 and then Table 4). This may be done in a similar way as described earlier relative to parameter stream generator 118.

In some examples, the parameter filter 134 may filter variable parameters from the parameter stream (e.g. of Table 4) and may filter the parameter stream to remove variable parameters that include fewer than a predetermined threshold number of characters. This may be result in, e.g. the filtered parameter stream of Table 5. This may be done in a similar way as described earlier relative to parameter filter 120.

The log message processor 130, parameter stream generator 132, and parameter filter 134 may perform these tasks on the fly as log messages 148 are received, such that filtered parameters are then continuously provided to the FIFO buffer handler 136 for further processing.

The P-FIFO$^\pi$ buffers 138 may include, for each unique parameter $\pi$ from the filtered parameter stream, a P-FIFO$^\pi$ buffer 138 containing any instances of its respective unique parameter it received in the within the time period $\Delta t$ immediately preceding the current time, where the time period $\Delta t$ may be a predetermined time period. For each parameter, the P-FIFO buffer 136 should include a timestamp of the log message 148 which contained the parameter, and a source component ID.

In some examples, when a new parameter $\pi$ is received in the filtered parameter stream from the network 102, the FIFO buffer handler 136 may remove any parameters $\pi$ older than the time period $\Delta t$ immediately preceding the current time from the P-FIFO$^\pi$ buffer 138 corresponding to the received new parameter $\pi$. The new parameter $\pi$ may then be compared with the rest of the parameters $\pi$ in the P-FIFO$^\pi$ buffer 138 corresponding to the received new parameter $\pi$ to update the $SP_{i,j}^\pi$ count. That is, if the new parameter $\pi$ is received from a given source component i, then for each j different from i, the corresponding $SP_{i,j}^\pi$ may be incremented by a number equal to the number of parameters $\pi$ from source component j contained in the P-FIFO$^\pi$ buffer 138. The FIFO buffer handler 136 may add the received new parameter to the P-FIFO$^\pi$ buffer 138.

In some examples, if a P-FIFO$^\pi$ buffer 138 does not exist for the received new parameter, then the FIFO buffer handler 136 may create a new P-FIFO$^\pi$ buffer 138 corresponding to that received new parameter $\pi$. On the other hand, the FIFO buffer handler 136 may delete an existing P-FIFO$^\pi$ buffer 138 when it no longer includes any parameters in the time period $\Delta t$ immediately preceding the current time.

In some examples, a simultaneous pair event having i, j, $\pi$, and t as parameters may be entered to a single S-FIFO, and the tail end of the same S-FIFO may be inspected for simultaneous pairs older than $t-\Delta T$. All those older simultaneous pairs are decremented from their corresponding $SP_{i,j}^\pi(t)$ state parameters, and consequently flushed from S-FIFO.

In some examples, the linkage score estimator 142 may, for each pair of source components, determine a score representing a topological linkage between the pair of source components. In some examples, for a given pair of source components i and j, the score may be given by:

$$\text{RecentScore}_{i,j}(t)=\Sigma_\pi(w_{i,j}^\pi(t)\cdot SP_{i,j}^\pi(t)-1 \quad (7)$$

Therefore, equation 7 is a temporal extension of equation 2. The weights $w_{i,j}^\pi(t)$ may be a function of parameter counts:

$$w_{i,j}^\pi(t) = \frac{1}{n_i^\pi(t)\cdot n_j^\pi(t)} \quad (8)$$

The parameter counts $n_i^\pi(t)$ may be given by sums over different counters in the C-FIFO$^\pi$ buffer 140 (i.e. parameter count buffer) corresponding to the parameter $\pi$:

$$n_i^\pi(t)=\Sigma_{k=1}^K CFIFO_k^\pi(t) \quad (9)$$

Each of the C-FIFO$^\pi$ buffers 140 stores, for its respective parameter $\pi$, parameter counts over a time period $\Delta T$ which is longer than the time period $\Delta t$. Every $\Delta T/K$ the FIFO buffer handler 136 may, for each of the C-FIFO$^\pi$ buffers 140, start a new counter at the top of the C-FIFO$^\pi$ buffer 140 and the oldest counter at the bottom of the C-FIFO$^\pi$ buffer 140 may be removed from the C-FIFO$^\pi$ buffer 140. Whenever a new parameter $\pi$ is received, the FIFO buffer handler 136 may increment the top counter of C-FIFO$^\pi$ buffer 140 corresponding to the new parameter $\pi$ (e.g. before handling the corresponding P-FIFO$^\pi$ buffer 138). A parameter count $n_i^\pi(t)$ may be incremented in addition to incrementing the most recent counter at the top of the corresponding P-FIFO$^\pi$ buffer 138 upon receipt of new log messages 148 containing new parameters $\pi$. The same parameter count $n_i^\pi(t)$ may be decremented by removing the count of the oldest counter from the parameter count $n_i^\pi(t)$ when that oldest counter is removed, namely, when the time of that counter is older than the $\Delta T$ immediately preceding the current time.

In some examples, if a C-FIFO$^\pi$ buffer 140 does not exist for the received new parameter, then the FIFO buffer handler 136 may create a new C-FIFO$^\pi$ buffer 140 corresponding to that received new parameter. On the other hand, the FIFO buffer handler 136 may delete an existing C-FIFO$^\pi$ buffer 140 when its $n_i^\pi(t)=0$.

In some examples, the topology estimator 143 may (at any given time), for each pair of source components i and j, predict whether there is a topological linkage between the source components i and j. The prediction may be based on whether the linkage score (e.g. RecentScore$_{i,j}(t)$) for that pair of source components i and j is above a threshold score (e.g. predetermined threshold score). Therefore, the topology estimator 143 may determine a topology including each of the components of the network 102 (or of a subset of the network 102).

FIG. 6 is a flow diagram illustrating a method 300 according to some examples. In some examples, the orderings shown may be varied, some elements may occur simultaneously, some elements may be added, and some elements may be omitted. In describing FIG. 6, reference will be made to elements described in FIG. 4. In examples, any of the elements described earlier relative to FIG. 4 may be implemented in the process shown in and described relative to FIG. 6. The example of FIG. 6 may, in some examples, correspond to the operation of the offline system 112 of FIG. 4.

At 302, the offline system 112 may receive log messages 148 from source components of the network 102. Any processes previously described as implemented in receiving the log messages 148 may be implemented at 302.

At 304, the log message processor 116 may generate a log message template for each of the log messages 148 (e.g. as in Table 2). Any processes previously described as implemented by the log message processor 116 may be implemented at 304.

At 306, the parameter stream generator 118 may generate a parameter stream (e.g. as in Table 3 and then Table 4). Any processes previously described as implemented by the parameter stream generator 118 may be implemented at 306.

At 308, the parameter filter 120 may filter variable parameters from the parameter stream (e.g. of Table 4) and may filter the parameter stream to remove variable parameters that include fewer than a predetermined threshold number of characters. This may result in, e.g. the filtered parameter stream of Table 5. Any processes previously described as implemented by the parameter filter 120 may be implemented at 308.

At 310, the simultaneous parameter counter 124 may, for each unique parameter in each pair of source components, determine the number of simultaneous parameters in the filtered parameter stream (stored in the log message database 122 or generated based on other data stored in the log message database 122, for example the unfiltered parameter stream, log message templates, and/or log messages 148). Any processes previously described as implemented by the simultaneous parameter counter 124 may be implemented at 310.

At 312, the linkage score estimator 126 may, for each pair of source components, determine a linkage score representing a topological linkage between the pair of source components. Any processes previously described as implemented by the linkage score estimator 126 may be implemented at 312.

At 314, the linkage score normalizer 128 may normalize the different determined linkage scores (representing different sets of source components) relative to each other such that the linkage scores can be used together to infer a global topology of the source components of the network 102 as a whole or a local topology of a number (e.g. more than two) of the source components in the network 102. Any processes previously described as implemented by the linkage score normalizer 128 may be implemented at 314.

At 316, the topology estimator 129 may, for each pair of source components, predict whether there is a topological linkage between the source components. The prediction may be based on whether the normalized linkage score for that pair of source components i and j is above a threshold score (e.g. predetermined threshold score). Therefore, the topology estimator 129 may determine a topology including each of the components of the network 102 (or of a subset of the network 102). Any processes previously described as implemented by the topology estimator 129 may be implemented at 316.

In some examples, the method 300 may return to 302 such that additional log messages 148 may be received, the method 300 may then be performed using the additional log messages 148.

FIG. 7 is a flow diagram illustrating a method 400 according to some examples. In some examples, the orderings shown may be varied, some elements may occur simultaneously, some elements may be added, and some elements may be omitted. In describing FIG. 7, reference will be made to elements described in FIG. 4. In examples, any of the elements described earlier relative to FIG. 4 may be implemented in the process shown in and described relative to FIG. 7. The example of FIG. 7 may, in some examples, correspond to the operation of the online system 114 of FIG. 4.

At 402, the online system 114 may receive log messages 148 from source components of the network 102. Any processes previously described as implemented in receiving the log messages 148 may be implemented at 402.

At 404, the log message processor 130 may generate a log message template for each of the log messages 148 (e.g. as in Table 2). Any processes previously described as implemented by the log message processor 130 may be implemented at 404.

At 406, the parameter stream generator 132 may generate a parameter stream (e.g. as in Table 3 and then Table 4). Any processes previously described as implemented by the parameter stream generator 132 may be implemented at 406.

At 408, the parameter filter 134 may filter variable parameters from the parameter stream (e.g. of Table 4) and may filter the parameter stream to remove variable parameters that include fewer than a predetermined threshold number of characters. This may result in, e.g. the filtered parameter stream of Table 5. Any processes previously described as implemented by the parameter filter 134 may be implemented at 408.

At 410, when a new parameter $\pi$ is received in the filtered parameter stream from the network 102, the FIFO buffer handler 136 may remove any parameters older than the time period $\Delta t$ immediately preceding the current time from the P-FIFO$^\pi$ buffer 138 corresponding to the received new parameter. The new parameter may then be compared with the rest of the parameters in the P-FIFO$^\pi$ buffer 138 corresponding to the received new parameter $\pi$ to update the simultaneous parameter count. That is, if the new parameter is received from a given source component i, then for each j, the corresponding simultaneous parameter count $SP_{i,j}^\pi$ may be incremented by a number equal to the number of parameters from source component j contained in the P-FIFO$^\pi$ buffer 138. The FIFO buffer handler 136 may add the received new parameter to the P-FIFO$^\pi$ buffer 138. Any processes previously described as implemented by the FIFO buffer handler 136 and P-FIFO$^\pi$ buffer 138 may be implemented at 410.

At 411, a simultaneous pair event having i, j, $\pi$, and t as parameters may be entered to a single S-FIFO, and the tail end of the same S-FIFO may be inspected for simultaneous pairs older than t–$\Delta T$. All those older simultaneous pairs are decremented from their corresponding $SP_{i,j}^\pi(t)$ state parameters, and consequently flushed from S-FIFO. Any processes previously described as implemented by the FIFO buffer handler 136 and P-FIFO$^\pi$ buffer 138 may be implemented at 411.

At 412, the FIFO buffer handler 136 may count parameter counts using sums over different counters in the C-FIFO' buffer 140 (i.e. parameter count buffer) corresponding to each parameter. Any processes previously described as implemented by the FIFO buffer handler 136 and C-FIFO$^\pi$ buffer 140 may be implemented at 412.

At 414, the linkage score estimator 142 may, for each pair of source components, determine a linkage score representing a topological linkage between the pair of source components. Any processes previously described as implemented by the linkage score estimator 142 may be implemented at 414.

At 416, the topology estimator 143 may, for each pair of source components, predict whether there is a topological linkage between the source components. The prediction may be based on whether the normalized linkage score for that pair of source components i and j is above a threshold score (e.g. predetermined threshold score). Therefore, the topology estimator 143 may determine a topology including each of the components of the network 102 (or of a subset of the network 102). Any processes previously described as implemented by the topology estimator 143 may be implemented at 416.

In some examples, the method 400 may return to 402 such that additional log messages 148 may be received, the method 400 may then be performed using the additional log messages 148. Although the method 400 is shown as returning to 402 after 416, in some examples the offline system 112 may continually receive log messages 148 while performing the remainder of its processing; such that its topology predictions may be continually updated based on recently received log messages 418.

Any of the processors discussed herein may comprise a microprocessor, a microcontroller, a programmable gate array, an application specific integrated circuit (ASIC), a computer processor, or the like. Any of the processors may, for example, include multiple cores on a chip, multiple cores across multiple chips, multiple cores across multiple devices, or combinations thereof. In some examples, any of the processors may include at least one integrated circuit (IC), other control logic, other electronic circuits, or combinations thereof. Any of the non-transitory computer-readable storage media described herein may include a single medium or multiple media. The non-transitory computer readable storage medium may comprise any electronic, magnetic, optical, or other physical storage device. For example, the non-transitory computer-readable storage medium may include, for example, random access memory (RAM), static memory, read only memory, an electrically erasable programmable read-only memory (EEPROM), a hard drive, an optical drive, a storage drive, a CD, a DVD, or the like.

All of the features disclosed in this specification (including any accompanying claims, abstract and drawings), and/or all of the elements of any method or process so disclosed, may be combined in any combination, except combinations where at least some of such features and/or elements are mutually exclusive.

In the foregoing description, numerous details are set forth to provide an understanding of the subject matter disclosed herein. However, examples may be practiced without some or all of these details. Other examples may include modifications and variations from the details discussed above. It is intended that the appended claims cover such modifications and variations.

The invention claimed is:

1. A non-transitory computer-readable storage medium comprising instructions executable by a system comprising a processor to:
   identify a first pair of parameters in respective first and second log message streams associated with respective first and second source components, and a second pair of parameters in the respective first and second log message streams, the first pair of parameters being identical and the second pair of parameters being identical;
   determine that the first pair of parameters are simultaneous and that the second pair of parameters are simultaneous in the first and in the second log message streams;
   determine a linkage score between the first and the second source components, the linkage score based on the determination that each of the respective first and the second pairs of parameters are simultaneous;
   calibrate the linkage score to produce a calibrated linkage score wherein the calibrated linkage score being greater than a threshold value indicates that a number of the first pair of parameters that are simultaneous and a number of the second pair of parameters that are simultaneous are not due to random noise; and
   determine that the first and second source components are topologically linked based on the calibrated linkage score.

2. The non-transitory computer-readable storage medium of claim 1, wherein the first and the second log message streams each includes at least one respective fixed parameter, wherein the first and the second pairs of parameters comprise variable parameters.

3. The non-transitory computer-readable storage medium of claim 2, further comprising instructions executable by the system to:
   classify log messages from the first and the second log message streams with a log message template; and
   designate the first and the second pairs of parameters as the variable parameters based on a threshold amount of variation of the first and the second pairs of parameters across log messages of the first and second log message streams.

4. The non-transitory computer-readable storage medium of claim 1, further comprising instructions executable by the system to:
   generate a parameter stream comprising a plurality of parameters that include the first and the second pairs of parameters.

5. The non-transitory computer-readable storage medium of claim 4, further comprising instructions executable by the system to filter the parameter stream to remove parameters of the plurality of parameters that comprise timestamps.

6. The non-transitory computer-readable storage medium of claim 4, further comprising instructions executable by the system to filter the parameter stream to remove parameters of the plurality of parameters that include fewer than a predetermined threshold number of characters.

7. The non-transitory computer-readable storage medium of claim 4, wherein each parameter of the first pair of parameters comprises a different substring than each parameter of the second pair of parameters.

8. The non-transitory computer-readable storage medium of claim 7, wherein the linkage score is determined using a weighted sum comprising a first count of the first pair of parameters that are simultaneous and a second count of the second pair of parameters that are simultaneous.

9. The non-transitory computer-readable storage medium of claim 8, wherein a first weight of the weighted sum corresponding to the first pair of parameters is greater than a second weight of the weighted sum corresponding to the second pair of parameters in response to the first pair of parameters being less common in the parameter stream than the second pair of parameters.

10. The non-transitory computer-readable storage medium of claim 4, further comprising instructions executable by the system to:
    store the plurality of parameters in a simultaneous parameter buffer,
    wherein determining that each of the respective first and the second pairs of parameters are simultaneous comprises:
        determining that the first pair of parameters are simultaneous in response to a first parameter of the first pair of parameters and a second parameter of the first pair of parameters being stored in the simultaneous parameter buffer at a same time; and
        determining that the second pair of parameters are simultaneous in response to a first parameter of the second pair of parameters and a second parameter of the second pair of parameters being stored in the simultaneous parameter buffer at a same time.

11. The non-transitory computer-readable storage medium of claim 4, wherein the linkage score is based on a count of the plurality parameters received within a predetermined time period since a current time.

12. The non-transitory computer-readable storage medium of claim 1, further comprising instructions executable by the system to update the linkage score based on a determination that a third pair of parameters are simultaneous within the first log message stream and in the second log message stream.

13. The non-transitory computer-readable storage medium of claim 1, further comprising instructions executable by the system to:
    determine another linkage score between a third component and the first source component or a fourth component; and
    normalize the linkage score and the other linkage score relative to each other,
    wherein the determination that the first and second source components are topologically linked is based on the normalized linkage score and the normalized other linkage score.

14. The non-transitory computer-readable storage medium of claim 13, wherein each respective linkage score of the linkage scores is normalized by dividing by a sum of linkage scores involving a same source component as one of the source components associated with the respective linkage score.

15. The non-transitory computer-readable storage medium of claim 13, wherein each respective linkage score of the linkage scores is normalized by dividing by a root mean square of linkage scores involving a same source component as one of the source components associated with the respective linkage score.

16. The non-transitory computer-readable storage medium of claim 1, further comprising instructions executable by the system to:
- determine another linkage score between a third component and the first source component or a fourth component;
- normalize the linkage score and the other linkage score relative to each other; and
- remove the other linkage score in response to a sum of linkage scores involving a same source component as one of the source components associated with the other linkage score being below a predetermined threshold,
- wherein the determination that the first and second source components are topologically linked is based on the normalized linkage score and not based on the removed other linkage score.

17. The non-transitory computer-readable storage medium of claim 1, wherein determining that the first and second source components are topologically linked based on the calibrated linkage score comprises determining that the first and second source components are topologically linked based on the calibrated linkage score exceeding the threshold value.

18. The non-transitory computer-readable storage medium of claim 1, wherein the calibrating of the linkage score comprises adjusting the linkage score based on a count of occurrences of each of the first and second pairs of parameters within a predetermined time period.

19. A system comprising:
- a processor; and
- a non-transitory storage medium comprising instructions executable on the processor to:
  - determine that variable parameters exist in log messages associated with respective source components;
  - determine that multiple simultaneous parameter events exist among the variable parameters in the log messages, each of the multiple simultaneous parameter events representing identical variable parameters that are associated with timestamps that differ by less than a threshold time period;
  - calculate linkage scores between the source components based on the determination that the multiple simultaneous parameter events exist;
  - calibrate the linkage scores to produce calibrated linkage scores wherein the calibrated linkage scores being greater than a threshold value indicate that the multiple simultaneous parameter events are not due to random noise; and
  - determine whether and which of the source components are topologically linked based on the calibrated linkage scores.

20. A method performed by a system comprising a hardware processor, comprising:
- identifying a first pair of parameters in respective first and second log message streams associated with respective first and second source components, and a second pair of parameters in the respective first and second log message streams, the first pair of parameters being identical and the second pair of parameters being identical;
- determining that the first pair of parameters are simultaneous and that the second pair of parameters are simultaneous in the first and in the second log message streams;
- determining a linkage score between the first and the second source components, the linkage score based on the determination that each of the respective first and the second pairs of parameters are simultaneous;
- calibrating the linkage score to produce a calibrated linkage score wherein the calibrated linkage score being greater than a threshold value indicates that a number of the first pair of parameters that are simultaneous and a number of the second pair of parameters that are simultaneous are not due to random noise; and
- determining that the first and second source components are topologically linked based on the calibrated linkage score.

* * * * *